United States Patent [19]

Luck

[11] 4,020,907
[45] May 3, 1977

[54] ROTARY GROUND BREAKER, SOIL PULVERIZER AND PASTURE RENOVATOR

[75] Inventor: Oral W. Luck, Gassville, Ark.

[73] Assignee: The Raymond Lee Organization, Inc., New York, N.Y.; a part interest

[22] Filed: Aug. 27, 1975

[21] Appl. No.: 608,175

[52] U.S. Cl. .............................. 172/554
[51] Int. Cl.² ............................. A01B 29/04
[58] Field of Search ......... 172/554, 555, 122, 540, 172/541, 543, 544, 550, 551, 713; D40/1 E

[56] References Cited

UNITED STATES PATENTS

| 72,438 | 12/1867 | Worley | 172/554 |
|---|---|---|---|
| 80,643 | 8/1868 | Lynch | 172/540 |
| 2,131,324 | 9/1938 | Hull | 172/554 |

| D237,525 | 11/1975 | van der Lely | 172/713 X |

*Primary Examiner*—Paul E. Shapiro
*Attorney, Agent, or Firm*—Howard I. Podell

[57] ABSTRACT

A rotary soil conditioner in the form of a cylinder fitted with pointed projecting curved tines. The tines each project to a distance from the cylinder surface that is approximately one-half the cylinder radius and are each curved in the direction of rotation of the cylinder with a radius of curvature of one-third the cylinder diameter, and with the center of the arc of each tine being on the surface of the cylinder. Each tine is preferably formed with an oval cross-section that narrows from the tine root to the tine tip, with the long axis of the oval cross-section oriented in the direction of rotation of the cylinder.

1 Claim, 5 Drawing Figures

ROTARY GROUND BREAKER, SOIL PULVERIZER AND PASTURE RENOVATOR

SUMMARY OF THE INVENTION

My invention is a rotary soil conditioner in the form of a cylinder fitted with pointed projecting curved tines. The tines each project to a distance from the cylinder surface that is approximately one-half the cylinder radius and are each curved in the direction of rotation of the cylinder with a radius of curvature of one-third the cylinder diameter, and with the center of the arc of each tine being on the cylinder surface. Each tine is preferably formed with an oval cross-section that narrows from the tine root to the tine tip, with the long axis of the oval cross-section oriented in the direction of rotation of the cylinder.

The cylinder and attached tines when mounted to a tractor by a three point hitch or drawbar hitch with hydraulic lift so as to cause the cylinder to freely rotate, will open up the surface of ground to permit rainfall and fertilizer to penetrate, without causing channels that encourage soil erosion, and leaving the soil in a roughened condition. The cylinder does not require as much force of the attached tractor as conventional tilling equipment. The cylinder does not require excess ballast weight since the tines being pried out of the ground act to force the cylinder downwards.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
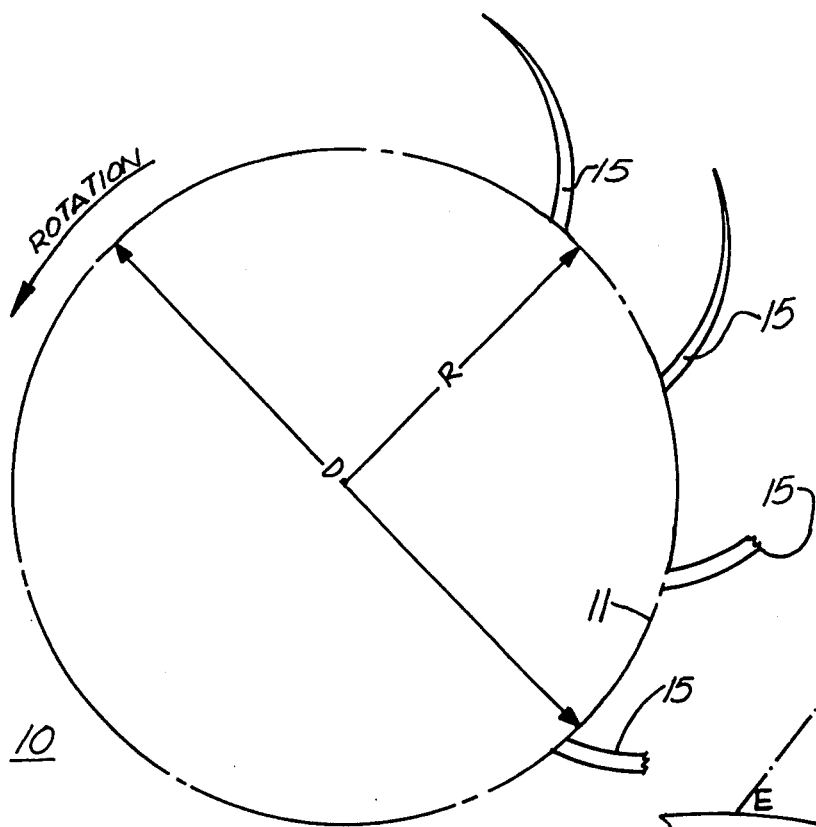
FIG. 1 is a sectional view of the invention.

Turning now descriptively to the drawings, in which similar reference characters denote similar elements throughout the several veiws, FIGS. 1–4 illustrate the rotary soil conditioner 10 which is in the form of a cylinder 11 that may be mounted by a hitch to a tractor with the cylinder freely rotating as the tractor draws the cylinder across a field.

Figure 2:
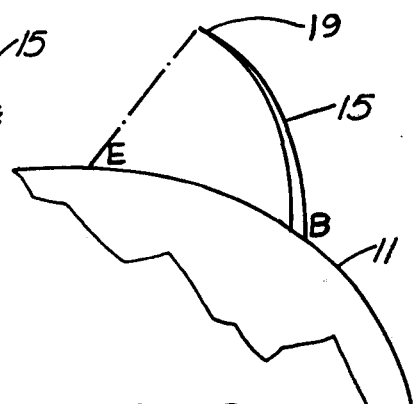
FIG. 2 is a fragmentary side view of a tine and the cylinder.

Pointed curved tines 15 are mounted to the cylinder with each tine 15 preferably shaped to project, as shown in FIG. 2, a radial distance CE from the cylinder 11 with distance CE equal to or less than one-half the cylinder radius $R_1$. Each tine 15 is curved with the pointed tip 19 of the tine projecting in the direction of cylinder rotation. The distance EB on the cylinder 11 from the root B of a tine 15 to the intersection of a radial line CE from the tine tip 19 to the cylinder 11 is preferably equal to a distance of one-third the cylinder diameter D, as is the radius of curvature $R_2$ of tine 15.

Figure 3:
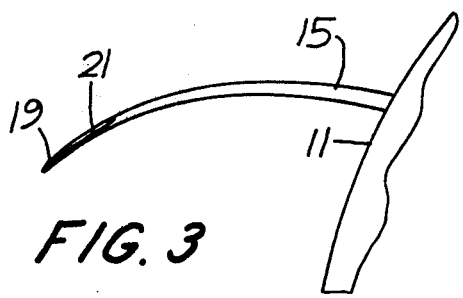
FIG. 3 is a side view of a tine.
Figure 5:
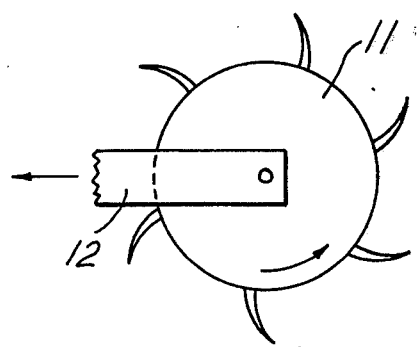
FIG. 5 is a detail side view of the cylinder and hitch.
Figure 4:
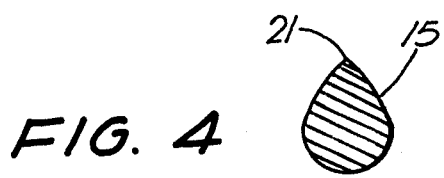
FIG. 4 is a sectional view of a tine.

As shown in FIG. 3, the convex leading edge 21 of each tine 15 is sharpened to a knife edge adjacent the tip end of the tine, with the remainder of the tine shaped in a general oval cross-section, with the long axis of the oval cross-section in the direction of cylinder rotation.

A small model of the invention may be employed as a manually-operated garden cultivator, with the cylinder rotatably joined by a shaft to a handle and yoke.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A rotatable cylinder fitted with tines for use in breaking up soil, said cylinder fitted with means for fastening to a tractor hitch so that the cylinder freely rotates when drawn by a tractor in a direction, in which
   the tines are each of a curved shape with the pointed free end of the tines facing the direction of cylinder rotation, with each tine formed in the shape of an arc, the radius of which is one-third the diameter of the cylinder, with the center of curvature of said arc lying on the surface of the cylinder.

* * * * *